April 27, 1948.     H. R. GROSS     2,440,265

FLASHER

Filed April 5, 1943

INVENTOR.
Henry R. Gross
By: Loftus, Moore, Olson & Trexler
Attys.

Patented Apr. 27, 1948

2,440,265

UNITED STATES PATENT OFFICE 2,440,265

FLASHER

Henry R. Gross, Chicago, Ill.

Application April 5, 1943, Serial No. 481,852

3 Claims. (Cl. 200—113)

This invention relates to an improvement in flashers, and more particularly to improvements in thermo-responsive flasher switches.

An object of the invention is to provide a flasher and an electric circuit in which said flasher is adapted to be inserted to alternately or synchronously flash a plurality of lamps or similar signal devices.

Prior flashers embodying thermo-responsive switches have not proven satisfactory because difficult to manufacture; of relatively high loss or breakage in manufacture; uncertain in operation; and of relatively high cost.

It is, accordingly, an important object of the invention to provide a flasher device of the character described, which is rugged in construction, inexpensive to manufacture, certain in operation, and of relatively low cost.

Prior flashers, with which applicant is familiar, have been found to be inherently dangerous to a certain extent when used to operate the turn signal lights of an automobile because of a relatively long delay between the time that the control is manipulated to operate the signal lights and the time that the lights are first turned on. It is during this time that in such devices the thermo-responsive member is being heated up and the lights remain off until such member has been fully heated, at which time some contacts are closed by such member to turn on the signal lights. This delay increases as the atmospheric temperature decreases, and it frequently occurs that, although the control is operated in advance of making the turn, the signal lights are not actually turned on or fully energized until the turn has been completed, or at least begun. An operator generally assumes that his signal lights are turned on whenever he operates the main control, but since this is not the fact, as pointed out above, the operator thus falsely relies upon his turn signal lights to indicate to the following drivers his intention to turn.

It is, therefore, an important object of the invention to provide a flasher device of great simplicity whereby the turn signal lights are energized instantaneously with the closure or operation of the main control so as to provide an instantaneous indication of intention to turn.

It is a further important object of the invention to provide in a device of the character described means by which an auxiliary or pilot light may be operated synchronously with the turn signal lights, and although electrically independent of the circuits of the signal lights, yet operable in response to current flowing in the signal light circuit.

It is a further object to provide in a device of the character described means by which grounded signal lights may be energized instantaneously upon operation of the main control, and a grounded pilot signal also energized instantaneously upon the operation of said main control without, however, requiring that the pilot signal be wired to the main control.

It is also an object of the invention to provide a flasher device of the character described by means of which lamps or other signals may be alternately flashed at adjustable intervals to provide means of identification such, for example, as means for identifying the origin and route of an airplane.

A further object is to provide a flasher which shall be self-compensating for variations in current supplied thereto to the end that changes in periodicity, due to changes in current, shall be eliminated or minimized.

Other and further objects and advantages of the invention will be apparent from the following description when taken in connection with the accompanying drawings, wherein—

Figure 1 is a view in perspective of a flasher device embodying the invention;

Figure 2 is an enlarged view in perspective of the flasher of Figure 1, but with the housing broken away for the purposes of illustration;

Figure 3 is an enlarged view in vertical section taken substantially along the line 3—3 of Figure 1;

Figure 4 is an enlarged view in horizontal section taken substantially along the line 4—4 of Figure 1;

Figure 5 is a schematic diagram of the flasher of Figures 1 to 4 in an auto turn signal circuit embodying the invention.

As shown in the drawings, the flasher 2 (Figures 1 through 4) may comprise a housing 4 in the form of a metal cylinder closed at one end and open at the other, and fitting over a mounting disk 6 of insulating material. In this housing and mounted on the disk 6 is a solenoid or relay 8 having a magnetic core 10, which is substantially U-shaped but has at its lower end a lateral lug 12 apertured to receive a mounting screw 14 threaded into the disk 6. A thin, narrow bi-metallic strip 16 is secured at one end to the upper leg of the core 10 as by soldering and carries a block or strip 18 of magnetic material, preferably soft iron secured as by soldering to the other end of the bi-metallic strip. A solenoid or relay coil 20 is wound upon the core between the two lateral arms thereof, and one end of the coil is connected to the core by the mounting screw 14. A wire 22 (Figures 1 and 3) extends from the other end of the coil through the opening in the insulating disk 6.

The magnetic block or strip 18 carries a contact 24 which is adapted to cooperate with a contact 26 carried by a metal strap or bracket 28 secured to the disk 6 by a screw 30 which projects below the disk to form a terminal screw, by means of which electrical connection may be established with the strap 28. The strap 28 is readily bendable to adjust the position of the fixed contact 26 relative to the movable contact 24, and may be provided with a finger piece 32 to facilitate manual adjustment of the fixed contact by such bending of this tstrap. Metal strap 34 secured by the screw 14 is bent to project into the path of the block or strip 18 of the magnetic material, and thus form a stop limiting the movement of the movable contact 24.

As shown in Figure 5, the flasher device 2 may be connected in a circuit to control auto turn signals, the wire 22 from the relay or solenoid coil 20 being connected to the positive or ungrounded side of a battery 36 or other source of electric energy, such, for example, as an auto generator (not shown). The fixed contact 26 is connected by wire 38, fastened to the terminal screw 30, to the movable switch blade 40 of the main turn signal control and selector switch 42.

The bi-metallic strip 16 maintains the contact 24 in engagement with the contact 26, and the movement of the contact 24 away from the contact 26 is resisted by the magnetic attraction of the block or strip 18 by the core 10 when the coil 20 is energized. The pressure of the engagement of these contacts is also determined in part by the adjusted position of the fixed contact 26 as determined by the bending of the strip 28. The main control or selector switch 42 also comprises fixed contacts 44 and 46 connected, respectively, to the right and left sets of turn signal lights. Thus, the contact 44 is connected by wire 48 and wires 50 and 52 in parallel to the left front turn signal light 54 and the left rear turn signal light 56. The signal light 54 may be grounded as at 58 and the turn signal light 56 grounded as at 60, in accordance with conventional practice. Similarly, the contact 46 is connected by wires 62 and wires 64 and 66 in parallel to the right front turn signal light 68 and the right rear turn signal light 70, these lights being grounded as at 72 and 74, respectively.

The operation of the device is as follows: Upon operation of the main control or selector switch 42, as, for example, to move the blade 40 into engagement with contact 44, a circuit is completed from battery 36 through wire 22, relay coil 20, core 10, bi-metallic strip 16, strip 18, movable contact 24, fixed contact 26, wire 38, movable switch blade 40, contact 44, wire 48, and wires 50 and 52 to the left front and rear turn signal lights. The coil 20 of relay 8 is of such low resistance as not appreciably to affect the current flow to the signal lights, that is, the coil 20 is of sufficiently low resistance that the signal lights will be fully, or substantially fully, energized.

The current flowing through the bi-metallic strip 16 is sufficient to heat the strip, and this heating of the strip causes a deformation of the strip in a direction to move the contact 24 away from the contact 26. The magnetic holding action of the core upon the armature block or strip 18 is sufficient, however, to hold these contacts in engagement for a desired period of time and until the deflecting force created by the heating of the bi-metallic strip is sufficient to overcome the magnetic holding action at which time the contacts separate rapidly. When the contact 24 is moved out of engagement with the contact 26, the flow of current through the relay coil, the bi-metallic strip, and to the turn signal lights is discontinued. The relay is thus rendered ineffective to attract the armature block 18, the heating of the bi-metallic strip is terminated, and the signal lights are extinguished. The bi-metallic strip now cools off and when it is cooled sufficiently to move the contact 24 back into engagement with the contact 26, the circuit is established to render the relay effective to hold the contacts in engagement during the re-heating of the bi-metallic strip, and to operate the signal lights. These cycles of operation will be repeated so long as the blade 40 of the main control or selector switch 42 engages one or the other of the contacts 44 or 46.

Adjustment of the strap 28 by bending thereof in a direction to move the contact 26 to the right, as in Figure 3, decreases the pressure of engagement between the contacts and accordingly increases the flashing rate, for then the bi-metallic strip 16 will not require as much heat to move the contact 24 out of engagement with the contact 26. Similarly, if the contact 26 is adjusted to the left, as seen in Figure 3, the pressure of engagement between the contacts is increased and the flashing rate decreased since then it requires a greater heat to build up in the bi-metallic strip a deflecting force sufficient to separate the contacts.

If current in the circuit increases or decreases from a normal value, the increase or decrease in the rate of heating of the bi-metallic strip is compensated for by the corresponding increase or decrease in the magnetic holding effect of the relay, so that changes in the speed of flashing, due to changes in the value of the current supplied to the circuit, are minimized or eliminated. When an auto engine is cold, the currents supplied to the circuits are less in value than when the engine is warm or hot, but in that event the magnetic holding effect is less, and consequently a slower heating of the bi-metallic strip will secure the same, or substantially the same, flashing rate.

The present application is a continuation-in-part of my abandoned co-pending application, Serial No. 459,076, filed September 21, 1942.

It is thought that the invention and numerous of its attendant advantages will be understood from the foregoing illustrative description, and it is obvious that numerous changes may be made in the form, construction, and arrangement of the several parts without departing from the spirit or scope of the invention or sacrificing any of its attendant advantages, the form herein described being a preferred embodiment for the purpose of illustrating the invention.

What I claim is:

1. A flasher comprising a housing having one wall formed by a member of insulating material, a relay in said housing and comprising a core mounted on said member, a coil upon said core, a switch blade comprising a thermo-responsive strip secured and electrically connected at one end to said core, an armature carried by said strip and attracted to said core when said coil is energized, a contact carried by said armature, a metal bracket mounted on said member, a switch contact carried by said bracket and positioned for engagement by the contact carried by the armature when the thermo-responsive strip is cold and for disengagement when the thermo-responsive strip is hot, terminal means connected to one end of the relay coil and extending out of the housing through said member, the other end of said coil being connected to said core, and additional terminal means connected to said bracket and extending out of the housing through said member.

2. A flasher comprising an insulating disk, a relay comprising a core secured to and upstanding from said disk, a coil about said core and electrically connected at one end to said core, said core having spaced legs, a switch blade comprising a bi-metallic strip fastened to one leg of said core in electrically conducting relation thereto and extending toward the other leg of the core, an armature secured to said strip and positioned in magnetic relation to the other leg of the core, a contact carried by said armature, a metal strap secured to said disk and upstanding therefrom, a contact carried by said strap in position for engagement by the contact carried by the armature, said strap being flexible and having an inclined portion forming a finger piece facilitating adjustable flexure of said strap to determine the pressure of engagement between said contacts whereby to determine the flashing rate, said relay coil and said strap being adapted to be connected to a source of electric energy and a circuit to be periodically opened and closed, and a sheet metal cylinder closed at one end and open at the other end to receive said disk and enclose said relay.

3. In a flasher, an electromagnet comprising a magnetically susceptible core, a coil wound upon said core, said core having laterally extending spaced portions, an electrically heated thermally responsive armature including a bimetallic member secured to one of said laterally extending portions of the core and magnetically attracted toward the other laterally extending portion of the core, a load terminal and a supply terminal, one of said terminals being connected to said coil, a switch comprising a movable contact carried by said armature and a stationary contact, said stationary contact being connected to the other of said terminals, said thermally responsive armature being mounted to move away from said core and open said switch contacts when said armature is heated to a given temperature, said armature being connected in series with the coil of the electromagnet, said switch contacts, said load terminal and said supply terminal so that the same value of current which flows from a source connected to the supply terminal and to a load connected to the load terminal passes through said thermally responsive armature and through said coil in series.

HENRY R. GROSS.

REFERENCES CITED

The following references are of record in the file of this patent:

UNITED STATES PATENTS

| Number | Name | Date |
| --- | --- | --- |
| 692,217 | Sundh | Jan. 28, 1902 |
| 891,400 | Brown | June 23, 1908 |
| 1,651,408 | Peacock | Dec. 6, 1927 |
| 1,704,709 | Murray | Mar. 12, 1929 |
| 1,981,934 | Werner | Nov. 27, 1934 |
| 2,003,638 | Nothstine | June 4, 1935 |
| 2,103,277 | Schmidinger | Dec. 28, 1937 |
| 2,125,668 | Chase | Aug. 2, 1938 |
| 2,172,068 | Murray | Sept. 5, 1939 |
| 2,180,701 | Wilson | Nov. 21, 1939 |
| 2,185,683 | Barrett et al. | Jan. 2, 1940 |
| 2,238,394 | Murray, Jr. | Apr. 15, 1941 |
| 2,262,344 | Shaw | Nov. 11, 1941 |
| 2,311,048 | Harrold | Feb. 16, 1942 |
| 2,338,474 | Wilson | Jan. 4, 1944 |